United States Patent

Shyu et al.

[11] Patent Number: 5,852,708
[45] Date of Patent: Dec. 22, 1998

[54] SIMPLIFIED ARCHITECTURE FOR DEFUZZIFICATION INTEGRATED CIRCUIT (IC) PROCESSOR INCLUDING CIRCUITS FOR ESTIMATING EFFECTIVE AREAS WITHOUT OVERLAPPING ERRORS

[75] Inventors: Jyuo-Min Shyu; Yao-Chou Lu, both of Hsinchu; Hsi-Chou Deng, Chupei; Hsu-Huang Cheng, Tainan, all of Taiwan

[73] Assignee: Industrial Technology Research Institute, Hsinchu, Taiwan

[21] Appl. No.: 676,909

[22] Filed: Jul. 8, 1996

Related U.S. Application Data

[63] Continuation of Ser. No. 52,712, Apr. 26, 1993, abandoned.

[51] Int. Cl.$^6$ .................................................. G06G 7/00
[52] U.S. Cl. .................................... 395/3; 395/51
[58] Field of Search ................................. 395/3, 900, 51

[56] References Cited

U.S. PATENT DOCUMENTS

| | | | |
|---|---|---|---|
| 4,837,725 | 6/1989 | Yamakawa | 395/3 |
| 4,875,184 | 10/1989 | Yamakawa | 395/3 |
| 5,131,071 | 7/1992 | Tsutsumi et al. | 428/425.9 |

OTHER PUBLICATIONS

IEEE International Conference on Fuzzy Systems. Pfluger et al., "A defuzzyfication strategy for a fuzzy logic controller emplying prohibitive infromation in command formulation";pp. 717–723, Mar. 1992.

IEEE Transactions on systems, Man, and Cybernetics. Lee, "Fuzzy Logic in Control Systems: Fuzzy Logic Controller Part II"; p. 419–435, Apr. 1990.

*Primary Examiner*—Richemond Dorvil
*Attorney, Agent, or Firm*—Finnegan, Henderson, Farabow, Garrett & Dunner, L.L.P.

[57] ABSTRACT

A digital defuzzification processor implemented as integrated circuits (ICs). The defuzzification IC processor includes an input port for receiving a plurality of input values and a corresponding set of specific weight and an effective area for each of the input values. The defuzzification IC processor further includes a multiplier for multiplying each of the input values to the corresponding specific weight for generating a plurality of partial-input-weighted-specific-weight, the multiplier further multiplying the each of the input values to the corresponding effective area for generating a plurality of partial-input-weighted-effective-area. The defuzzification IC processor further includes an accumulator for adding each of the plurality of partial input-weighted-specific-weight for generating a summed-input-weighted specific-weight, the accumulator further adding each of the plurality of partial-input-weighted-effective-area for generating a summed-input weighted-effective-area. The defuzzification IC processor further includes a divider for dividing the summed-input-weighted-specific-weight by the summed-input-weighted-effective-area for generating a crisp output.

12 Claims, 8 Drawing Sheets

| SEGMENT | s1 s2 | s2 s3 | s3 s4 | s4 e1 | e1 e2 | e2 e3 | e3 e4 |
|---|---|---|---|---|---|---|---|
| MEMBERSHIP FUNCTION | 1 | 1, 2 | 1, 2, 3 | 1, 2, 3, 4 | 2, 3, 4 | 3, 4 | 4 |
| OVERLAPPING NUMBER | 1 | 2 | 3 | 4 | 3 | 2 | 1 |

SIMPLIFIED ARCHITECTURE FOR DEFUZZIFICATION INTEGRATED CIRCUIT (IC) PROCESSOR INCLUDING CIRCUITS FOR ESTIMATING EFFECTIVE AREAS WITHOUT OVERLAPPING ERRORS

CROSS-REFERENCE TO RELATED APPLICATION

This is a continuation of application Ser. No. 08/052,712, filed Apr. 26, 1993, now abandoned.

BACKGROUND OF THE INVENTION

1. Field of the Invention

This invention relates generally to the fuzzy logic control apparatus and method. More particularly, this invention relates to the system design and method for implementing an improved defuzzification algorithm.

2. Description of the Prior Art

Since the centroid technique is commonly used for generating a crisp output in the defuzzification processes, improvements made in carrying out the processing steps for centroid computation via hardware implementations on an integrated circuit chip will also improve the overall performance level of the fuzzy logic control. Specifically, a circuit architecture for implementing an algorithm to compute the centroid more accurately while reduces the circuit complexity and increases the through-put would find broad use among different fuzzy logic control applications.

As all fuzzy logic inference methods result in fuzzy values for all input information, a defuzzification process which generate a single crisp output value by picking a value best represents the membership function must be performed.

The process of defuzzification involves several steps. First, each of the input variables is applied to a corresponding membership function to obtain an output membership function. These output membership functions must be integrated, i.e., combined, to generate an integrated output membership function for computing a 'crisp output'.

Figure 1A:
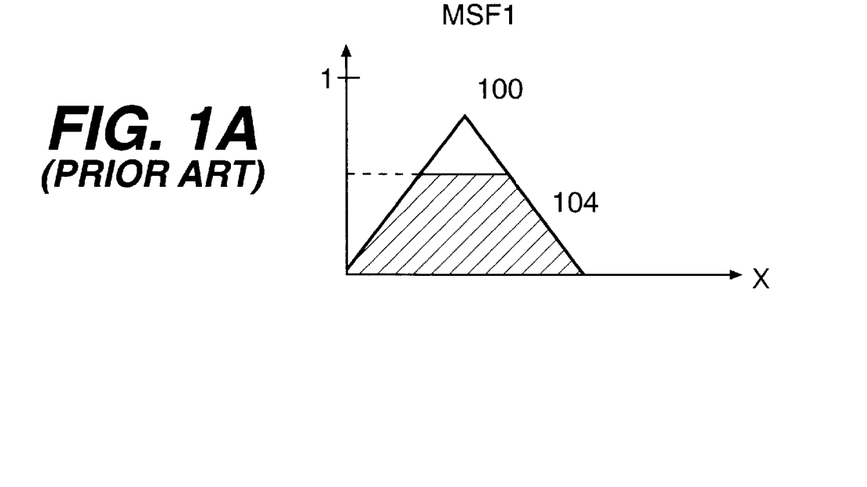
FIGS. 1A–1B show a plurality of membership functions wherein an α-Cut operation is performed to obtain the corresponding output membership functions.
Figure 1B:
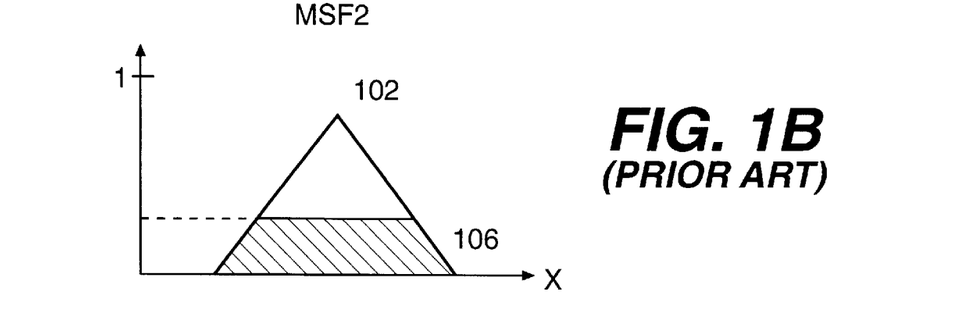
Figure 1C:
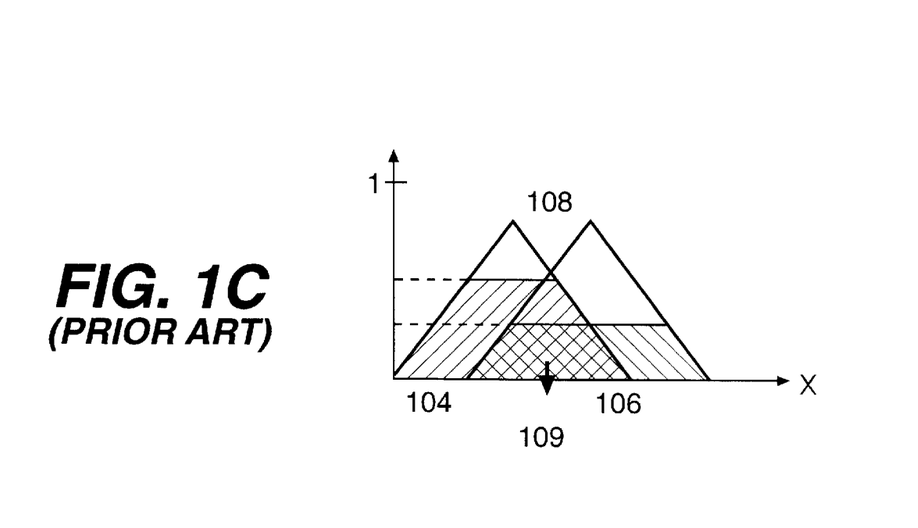
FIG. 1C shows an integration of a plurality of output membership functions of FIG. 1A to obtain an integrated output membership function and a centroid computation is performed to obtain the crisp output.

There are several prior art techniques which are applied for defuzzification of the inference functions. The first technique is a maximum-minimum method proposed by Mandani. It comprises three major steps. As shown in FIG. 1A, an α-cut is performed on a first member ship function MSF-1 (100) and a second membership function MSF-2 (102) to obtain a corresponding output membership function, i.e., 104 and 106, represented by the shaded areas. An integrated output membership function (108) is obtained by taking the maximum value of these two individual output membership functions (FIG. 1B). The centroid 109 of this integrated output membership function is the crisp output generated by this defuzzification process. The centroid 109, i.e., G of the integrated output membership function is computed by:

$$G = (\int x \mu \, dx)/(\int \mu \, dx) \qquad (1)$$

Where $\mu$ is the value of the integrated output membership function.

The Max-Min method as disclosed by Mandani requires substantial data storage for storing the membership functions in a plurality of data arrays, A comparison operation must also be executed to determine the integrated output membership function. These requirements hinders the implementation of this defuzzification method by the use of an integrated circuit on a silicon chip.

Figure 2A:
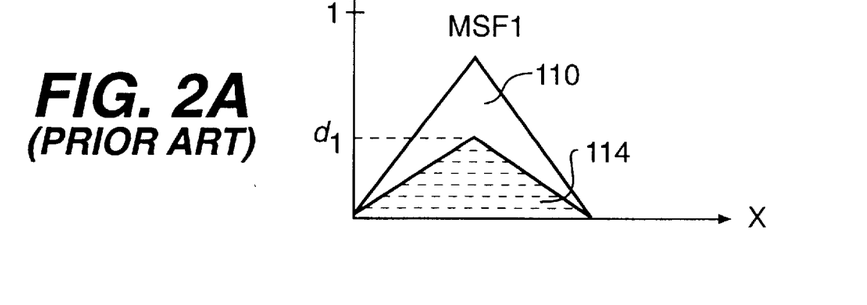
FIGS. 2A–2B show a plurality of membership functions wherein an α-Dot operation is performed to obtain the corresponding output membership functions.
Figure 2B:
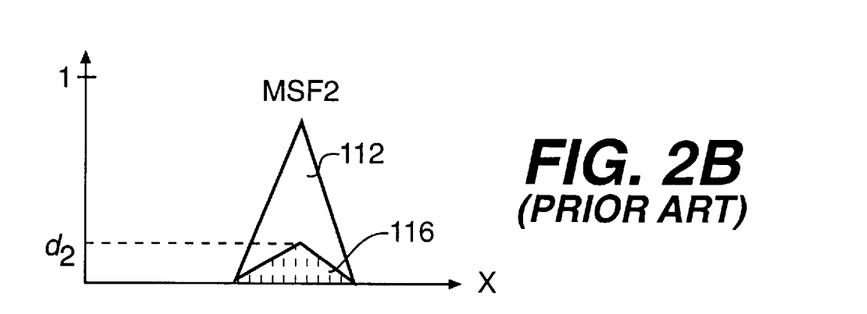
Figure 2C:
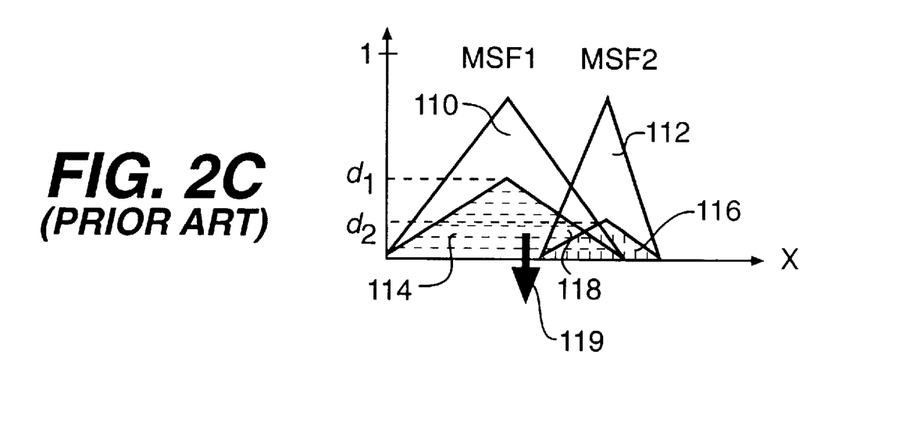
FIG. 2C shows an integration of a plurality of output membership functions of FIG. 2A to obtain an integrated output membership function and a centroid computation is performed to obtain the crisp output.

Togai discloses a similar method to perform the defuzzification process which is commonly referred to as the Max-Dot method. Instead of carrying out an α-cut as in the Max-Min method, an α-Dot operation is performed (see FIG. 2A). The processes of obtaining an integrated output membership function and the computation of the centroid to generate the crisp output is the same as that for the Max-Min method described above. It comprises three major steps. As shown in FIG. 2A, an α-Dot is performed on a first member ship function MSF-1 (110) and a second membership function MSF-2 (112) to obtain a corresponding output membership function, i.e., 114 and 116, represented by the shaded areas. An integrated output membership function (118) is obtained by taking the maximum value of these two individual output membership functions (FIG. 2B). The centroid 119 of this integrated output membership function, i.e., same computation as Equation (1), is the crisp output generated by this defuzzification process.

This method suffers the same limitations as the Max-Min method since it also requires substantial data storage capacity and execution of the more complicate comparative and integration operations. An IC implementation of this method on a silicon chip is again very difficult.

Figure 3A:
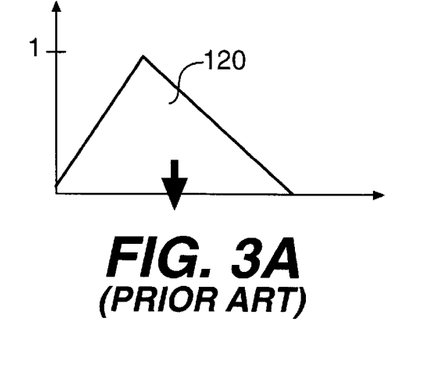
FIGS. 3A–3B show a membership function wherein an unit height Singleton operation is applied; to obtain an output membership functions.
Figure 3B:
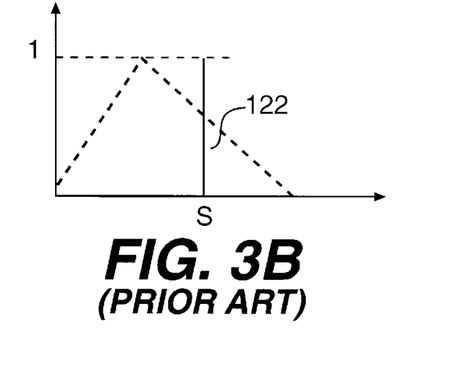
Figure 3C:
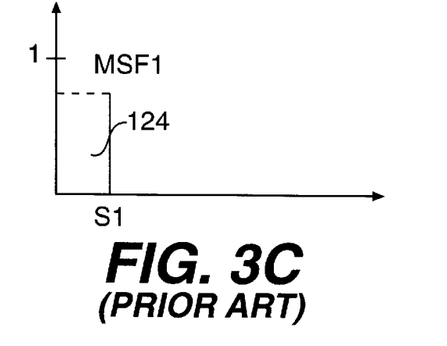
FIG. 3C–3D shows two output membership functions obtained as the unit height Singleton operation is applied to two corresponding membership functions.
Figure 3D:
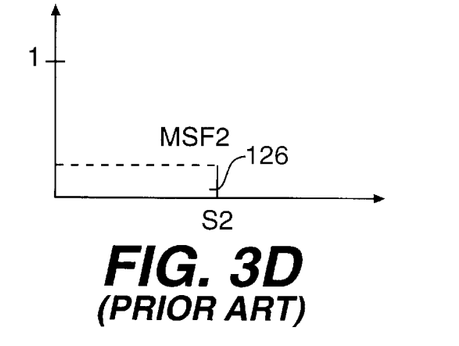
Figure 3E:
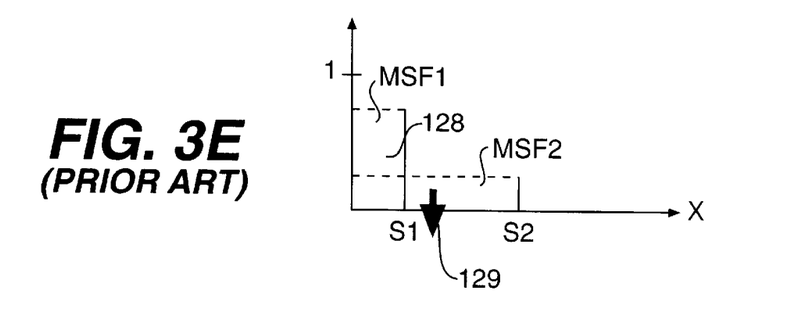
FIG. 3E shows an integration of a plurality of output membership functions of FIG. 3B to obtain an integrated output membership function and a centroid computation is performed to obtain the crisp output.

Another technique which is generally referred to as the Singleton method is depicted in FIGS. 3A to 3C. The membership function 120 (FIG. 3A) is first simplified to become a single vertical line 122 of height 1.0. The output membership functions are simply a rectangles, i.e., 124 and 126. (FIG. 3B). The centroid 129 of the integrated output membership 128 function is then computed to generate the crisp output (FIG. 3C). The computation of the centroid 129 is carried out according to the following equation:

$$G = (\Sigma \alpha_i S_i)/(\Sigma \alpha_i) \qquad (2)$$

Where $\alpha_i$ is the input value and $S_i$ is the corresponding output values obtained from the corresponding membership functions as shown in FIG. 3B.

The data storage requirement of this method is reduced and the computations are also greatly simplified. Singleton technique thus provides a defuzzification method suitable for IC implementation.

The singleton technique however does not consider the fact that the original input membership functions may comprise different shape of triangles, the relative weighting effect of each output membership function may not be the same. An improved Singleton method is disclosed wherein each output membership function is multiplied by a weighting factor $h_i$ where $h_i$ is proportional to the area of its original input membership function. The crisp output is then calculated according to the following equation:

$$G = (\Sigma \alpha_i h_i S_i)/(\Sigma \alpha_i h_i) \qquad (3)$$

Although this improved method requires more data storage and applies slightly more complicate processes in computing the crisp output, it does however generates more accurate results and still provides an algorithm that is feasible for implementation on an IC chip.

However, in computing the centroid by the use of equation (3) wherein as the improved Singleton method performs a summation in the nominator, the overlapping areas between the output membership functions are being repeatedly added. An error may be generated by not properly taking into consideration of this repetition especially under the circumstances where the overlapping may severely skew the result of the location of the centroid. Therefore, a need still exists in the art of fuzzy control system for an improved defuzzification technique in order to overcome these limitations.

SUMMARY OF THE PRESENT INVENTION

One object of the present invention is to teach an algorithm and the circuit implementations to perform a defuzzification process wherein an error which may be generated by a prior art technique is eliminated.

Another object of the present invention is to provide a defuzzification method which does not require great volume of data storage and the computations are relative simple such that the method can be implemented on an IC chip.

Another object of the present invention is to provide an IC device for performing the defuzzification process where the computation is accurate while the device can be manufactured in large quantity at low cost such that broad applications of the apparatus to many types of fuzzy control circuits may be achieved.

Briefly, the present invention comprises a logic circuit device for computing the centroid of an integrated polygons of a plurality of α-Dot polygons having a plurality of intersected areas. The logic circuit comprises an input port for receiving a plurality of values of the α's for the α-Dot operation and specific weight and effective area for each of the α-Dot polygons. The circuit logic further includes an multiplication-and-adding means to compute a first sum of the products of the value of α to the specific weight and a second sum of the products of the value of α to the effective volume. The logic circuit further includes a dividing means to divide the first sum by the second sum to obtain the centroid of the integrated polygon.

In a preferred embodiment, the present invention comprises a fuzzy logic control system including a defuzzification co-processor for generating crisp output from a plurality of membership functions. The defuzzification co-processor includes an input port for receiving an input value α, a specific weight and an effective area for each of the membership functions. The defuzzification co-processor further includes a multiplication-and-adding means to compute a first sum of the products of the value of α to the specific weight of corresponding membership function and a second sum of the products of the value of α to the effective area of corresponding membership function. The defuzzification co-processor further includes a dividing means to divide the first sum by the second sum to obtain the crisp output of the membership functions for the fuzzy control logic system.

One advantage of the present invention is that it provides an algorithm and the circuit implementations to perform a defuzzification process wherein an error which may be generated by a prior art technique is eliminated.

Another advantage of the present invention is that it provides a defuzzification method which does not require great volume of data storage and the computations are relative simple such that the method can be implemented on an IC chip.

Another advantage of the present invention is that it provides an IC device for performing the defuzzification process where the computation is accurate while the device can be manufactured in large quantity at low cost such that broad applications of the apparatus to many types of fuzzy control circuits may be achieved.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 4:
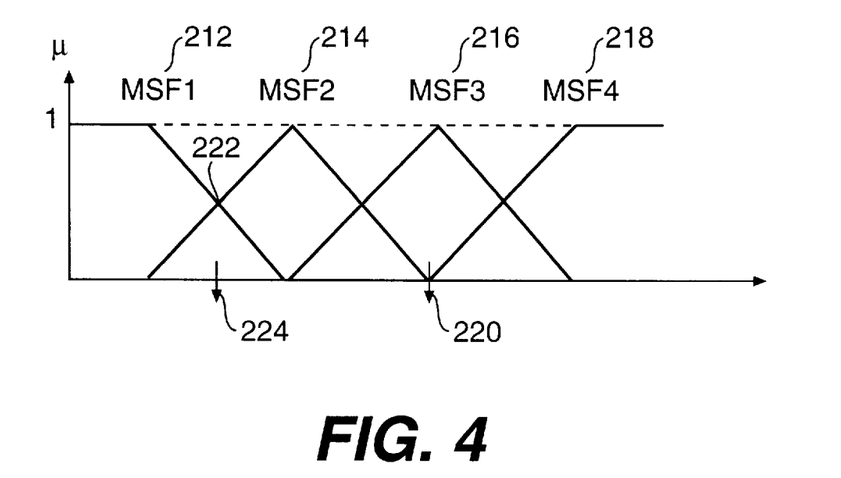
FIG. 4 shows a plurality of membership functions wherein each membership function only overlaps with the neighboring membership functions.

For the purpose of describing the present invention, the output membership functions are assumed to be either trapezoid or triangle in shape and that each output membership function only overlaps with the neighboring membership functions as shown in FIG. 4. Assuming that the area of an i-th output membership function is Ai and the center of gravity of that function is Si while the overlapping area is Dj with a center of gravity at Xj. FIG. 4 shows four output membership functions MSF-1 (212), MSF-2 (214), MSF-3 (216), and MSF-4 (218) wherein a first shaded area in MSF-3 (216) has a center of gravity S3 (220) while MSF-1 (212) has an overlapping area 222 with MSF-2 (214) and a second shaded area 222 has a center of gravity 224, i.e., X1.

Figure 5:
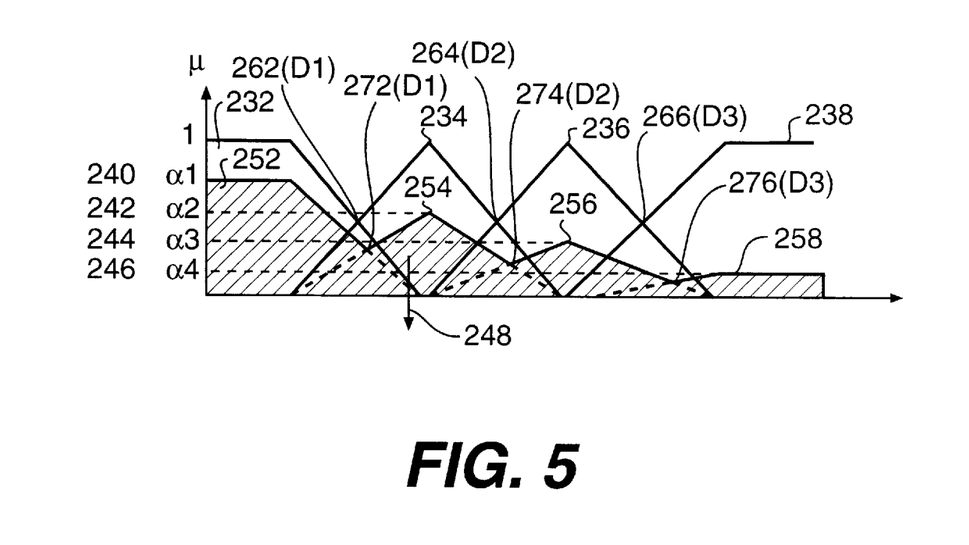
FIG. 5 shows the overlapping areas and an integration of four membership functions to illustrate the correlation of the centroids and the ratios of areas between the overlapping areas and the α-dot overlapping areas.
Figure 6:
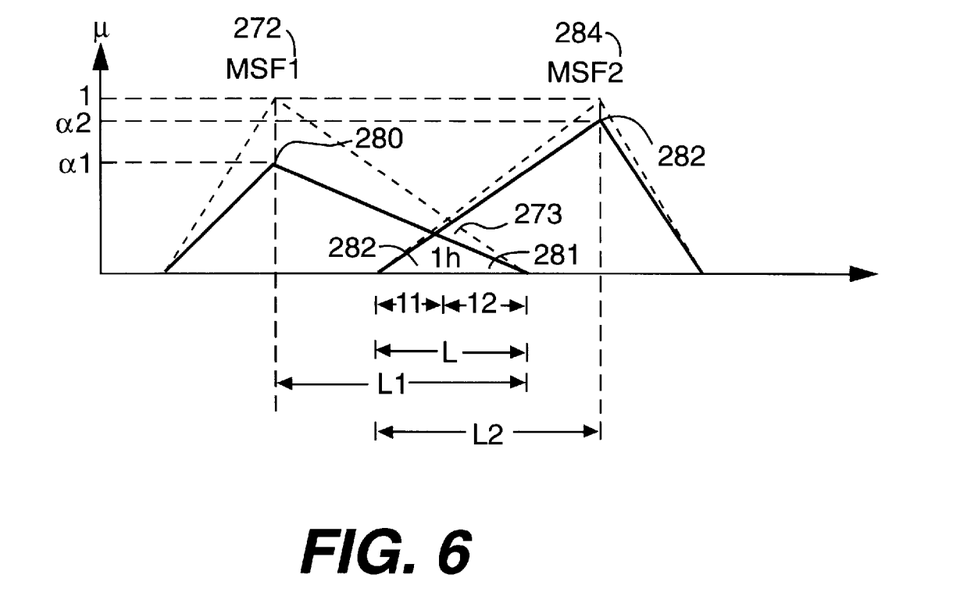
FIG. 6 shows the overlapping areas and an integration of two membership functions to illustrate a simplified computation of the centroids.

FIG. 5 shows four membership functions 232, 234, 236, and 238. There are four input, i.e., α1 (240), α2 (242), α3 (244), and α4 (246). A Max-Dot method is applied to obtain an integrated output membership function 248 as represented by the shaded zone. The integrated output membership function 248 comprises four Max-Dot shaded zones, i.e., zones 252, 254, 256, and 258 contributed by individual output membership function 232, 234, 236, and 238 respectively. There are also three overlapping zones, i.e., Dj where j=1, 2 and 3, between the membership functions, i.e., 262 (D1), 264 (D2), and 266 (D3) and three overlapping zones, i.e., D'j where j=1, 2 and 3, between the Max-Dot zones, i.e., 272 (D'1), 274 (D'2), and 276 (D'3). By comparing these two set of zones, it is clear that a functional relationship exists and that is $$a_i/A_i = \alpha_i \tag{5}$$

Where Ai is the area of the (i-th) membership function, i.e., zones 232, 234, 236, and 238 and $a_i$ is the area of the shaded zones 252, 254, 256, and 258 respectively. It can also be observed that the points of center of gravity for these two sets of zones are the same. Assuming that ratio of the overlapping zones, i.e., D'j/Dj is βj, where j=1, 2, and 3, then the location of the centroid G can be calculated by the following equation:

$$G = (\Sigma \alpha_i Ai\, Si - \Sigma \beta j\, Dj\, Xj)/(\Sigma \alpha_i Ai - \Sigma \beta j\, Dj) \tag{6}$$

Where Ai, Si, and Dj are constants which are maintained unchanged in the defuzzification process while $\alpha_i$ and βj are variable parameters wherein the value of βj depends on the values of the input $\alpha_i$. For the determination of βj, two membership functions 272 and 274 having an overlapping zone 273 are shown in FIG. 6. A Max-Dot process is applied by the use of an input variable 276 ($\alpha_1$) to membership function 272 and another input variable 278 ($\alpha_2$) to the membership function 274 to obtain two integrated membership zones 280 and 282 respectfully wherein zones 280 and 282 overlap to form an integrated overlapping zone 281 which has base 284 of length L comprising two segments λ1 and λ2 as divided at the point where zones 280 and 282 intersect.

$$h/\alpha_1 = \lambda_2/L_1 \tag{7}$$

$$h/\alpha_2 = \lambda_1/L_2 \tag{8}$$

From equations 7 and 8, a ratio of λ1/λ2 can be derived as $$\lambda_1/\lambda_2 = \alpha_1 L_2/\alpha_2 L_1 \tag{9}$$

$$\lambda_1 = (\alpha_1 L_2 L)/(\alpha_1 L_2 + \alpha_2 L_1)$$

$$\lambda_2 = (\alpha_2 L_1 L)/(\alpha_1 L_2 + \alpha_2 L_1) \tag{10}$$

From equations (8), (9), and (10), the height h of the integrated overlapping zone 281 can be represented as:

$$h^2 = (\lambda_1 \lambda_2 \alpha_1 \alpha_2)/L_1 L_2 \tag{11}$$

$$= (\alpha_1^2 \alpha_2^2 L^2)/(\alpha_1 L_2 + \alpha_2 L_1)^2$$

$$h = (\alpha_1 \alpha_2 L)/((\alpha_1 L_2 + \alpha_2 L_1)) \tag{12}$$

The ratio β of the areas of the integrated overlapping zone 281 to that of the membership overlapping zone is computed by substituting $\alpha_1$ 1=1 and $\alpha_2$ 2=1 into the computation.

$$\beta = h(\alpha_1, \alpha_2)/h(1,1) = \alpha_1 \alpha_2 (L_1 + L_2)/(\alpha_1 L^2 + \alpha_2 L_1) \tag{13}$$

An approximation is made by assuming that $$C_1 = [\partial \beta/\partial \alpha_1] \text{ by setting } \alpha_1=1 \text{ and } \alpha_2=1$$

$$C_2 = [\partial \beta/\partial \alpha_2] \text{ by setting } \alpha_1=1 \text{ and } \alpha_2=1$$

the value of the ratio β can be calculated as:

$$\beta = [(L_1 + L_2)/L_1]^{-1} \alpha_1 + [(L_1 + L_2)/L_2]^{-1} \alpha_2 \tag{14}$$

$$\beta = C_1 \alpha_1 + C_2 \alpha_2 \tag{15}$$

If the centroid of the integrated overlapping zone 81 is maintained unchanged, the computation of the centroid in the defuzzification process may be further simplified by substituting into equation (6) by representing the of βj as function of $\alpha_1$, and $\alpha_2$ as equation (15).

$$\beta j = C_n \alpha_n + C_m \alpha_m \tag{16}$$

and $$\begin{aligned}
G &= (\Sigma \alpha_i Ai Si - \Sigma \beta j Dj Xj)/(\Sigma \alpha_i Ai - \Sigma \beta j Dj) \\
&= [\Sigma \alpha_i Ai Si - \Sigma (C n \alpha_n + C_m \alpha_m) Dj Xj]/ \\
&\quad [\Sigma \alpha_i Ai - \Sigma (C n \alpha_n + C_m \alpha_m) Dj] \\
&= (\Sigma \alpha_i W_i)/(\Sigma \alpha_i E_i)
\end{aligned} \tag{17}$$

where Wi is the product of the membership function area to its centroid minus the product of the overlapping area to the centroid of the overlapping zones. Wi is generally referred to as the specific weight of the zone of the membership function. And Ei is the effective area, i.e., the sum of areas of all the zones minus the area of the overlapping zones. Equation (17) thus can be effectively used to compute the centroid in the defuzzification operation.

Figure 7:
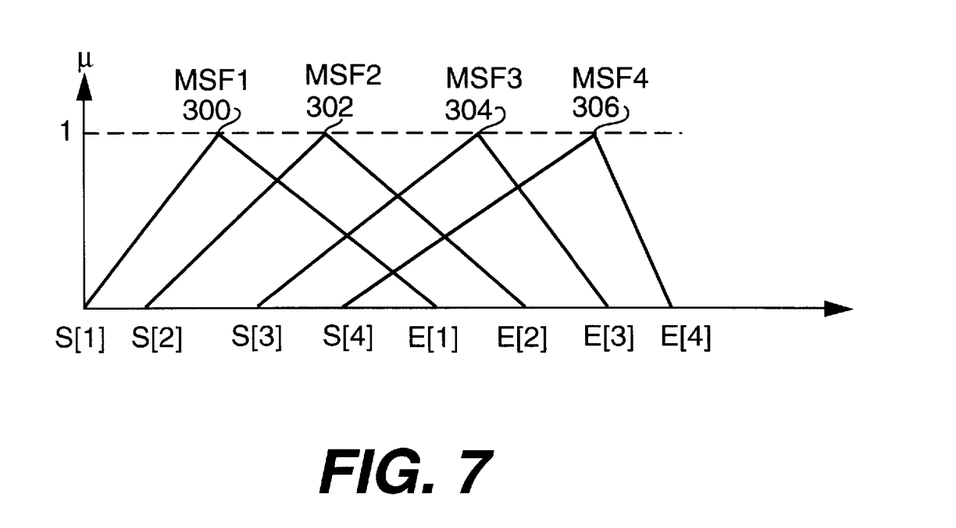
FIG. 7 shows a plurality of overlapping membership functions wherein each membership function may have multiple overlaps with several membership functions.

Under the situation where there are multiple overlapping between several membership functions as shown in FIG. 7, a method is used according to the following system implementation to take into account twice, three-times or even more times of overlapping such that correct centroid can be computed to obtain accurate crisp output.

Figure 8A:
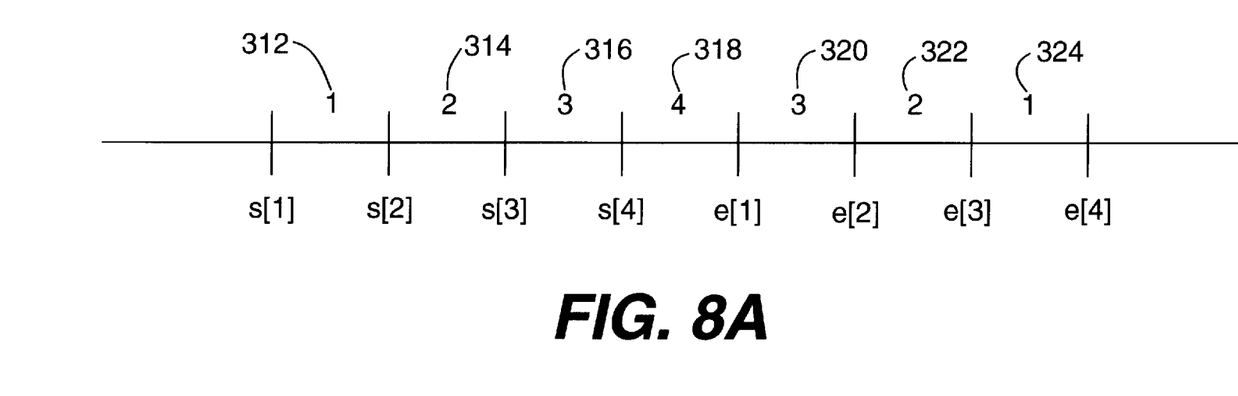
FIG. 8A is a range segment diagram to illustrate a method for computing overlapping numbers between membership functions.
Figure 8B:
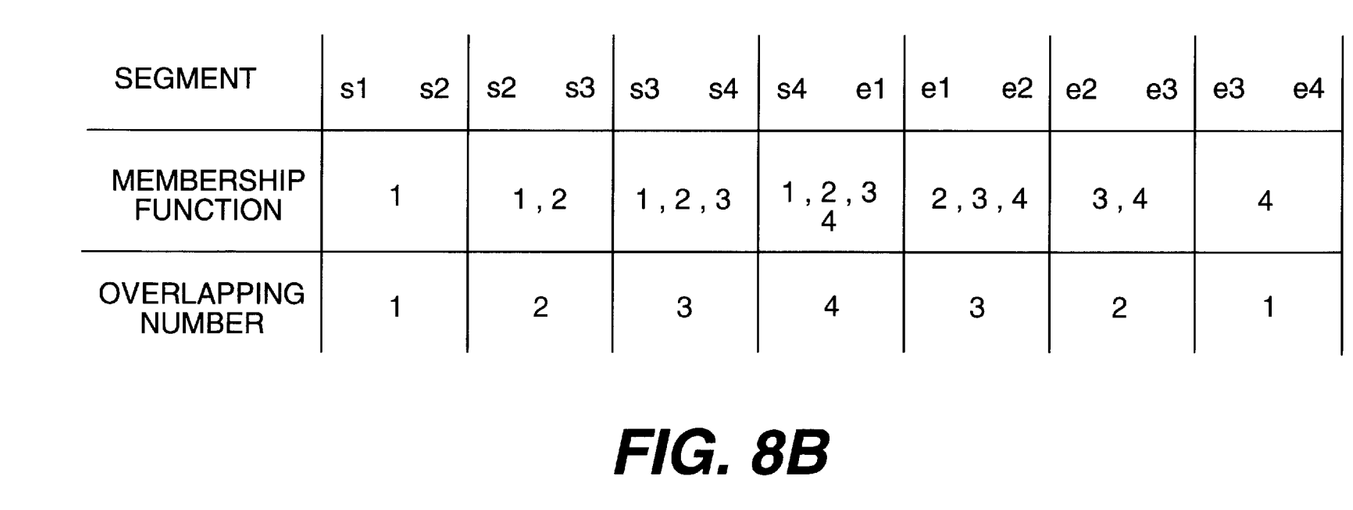
FIG. 8B is a range segment diagram showing the result of the computations of FIG. 8A.

FIG. 7 shows four membership functions, i.e., membership functions 300, 302, 304, and 306. The beginning and end coordinates of the base on the X-axis are denoted as S(1), S(2), S(3), S(4), and E(1), E(2), E(3), and E(4) respectively. For these four membership function, a range segment diagram is constructed as that shown in FIG. 8A wherein the overall range covered by all the membership functions are divided into many segments, i.e., segments 312 to 324, by the beginning and the end points of the base of the membership functions. For each segment, an overlapping number is computed by the following three steps:

Step 1:

The overlapping number is computed by adding one when an S(I) is encountered and subtracting one when an E(I) is encountered in counting from left to right. FIG. 8B shows the calculated overlapping numbers, i.e., the numbers in the parenthesis. Table 1 shows the calculated overlapping number for each segment with an indication of the overlapping membership functions involved for each segment.

TABLE 1

| Segment | S1-S2 | S2-S3 | S3-S4 | S4-E1 | E1-E2 | E2-E3 | E3-E4 |
|---------|-------|-------|-------|-------|-------|-------|-------|
| Overlapping Membership Functions | 1 | 1, 2 | 1, 2, 3 | 1, 2, 3, 4 | 2, 3, 4 | 3, 4 | 4 |
| Overlapping Number | 1 | 2 | 3 | 4 | 3 | 2 | 1 |

Step 2:

Starting with the segment which has the highest overlapping number, e.g., segment S4-E1 in Table 1, and considering the fact that the overlapping in segment S4-E1 must also be counted by the next segment S3-S4 or E1-E2 both have overlapping number of 3, i.e., one less than the overlapping number of segment S4-E1. For that reason, if the overlapping number of one segment is one higher than the next segment, then these two segments can be combined as one segment with an combined overlapping number decreased by one. For example, the overlapping number of S3-E1 has a combined overlapping number of three and similarly, the segment S4-E2 has a combined overlapping number of three.

Step 3:

On the other hand, if the overlapping numbers of the two neighboring segments are the same, then these three segments can be combined together with a combined overlapping number one less than the original overlapping number. For example, since the overlapping number of S4-E1 is four, and the overlapping numbers of the two neighboring segments, i.e., S3-S4 and E1-E2, are both three, therefore, the combined overlapping number of S3-E2 is two.

Table 2 shows the processes as outlined in the above steps 1 to 3 starting with segment S4-E1 from the top which has an overlapping number of four to compute the overlapping numbers for the neighboring segments and progressive extending the computation outwardly until an overlapping number of two is reached as shown at the bottom of Table 2.

TABLE 2

| Overlapping Number | Segment(s)/Overlapping Membership Functions (In Parentheses) | | | | | |
|---|---|---|---|---|---|---|
| 4 | S4-B1/ (1, 2, 3, 4) | | | | | |
| 3 | S4-E1/ (1, 2, 4) | S3-E1/ (1, 2, 3) | S4-E2/ (2, 3, 4) | | | |
| | (1, 3, 4) | | | | | |
| 2 | S4-E1/ (1, 4) | S3-E1/ (1, 3) | S4-E2/ (2, 4) | S3-E2/ (3, 2) | S2-E1/ (2, 1) | S4-E3/ (4, 3) |

From Table 2, above, it is clear that when the overlapping is larger than two, the "overcounted" overlapping segment (s) should be counted carefully in equation (17). In this example S3-E1 and S4-E2 are deducted twice and have to be again added, but as a result of this addition the overlapping segment S4-E1 is added twice, so it is to be deducted once again.

An overlapping number computing means is thus demonstrated. After the determination of the overlapping numbers and the associated membership functions over each segment, an effective area can be computed by properly subtracting the areas which are repeatedly contributed by the multiple overlapping areas. The area and the centroid of each overlapping area can also be individually computed. By the use of Equations (14) and (17), a correct centroid can be computed with the specific weight and the effective areas for the combined membership function for a determination of the crisp output.

Figure 9:
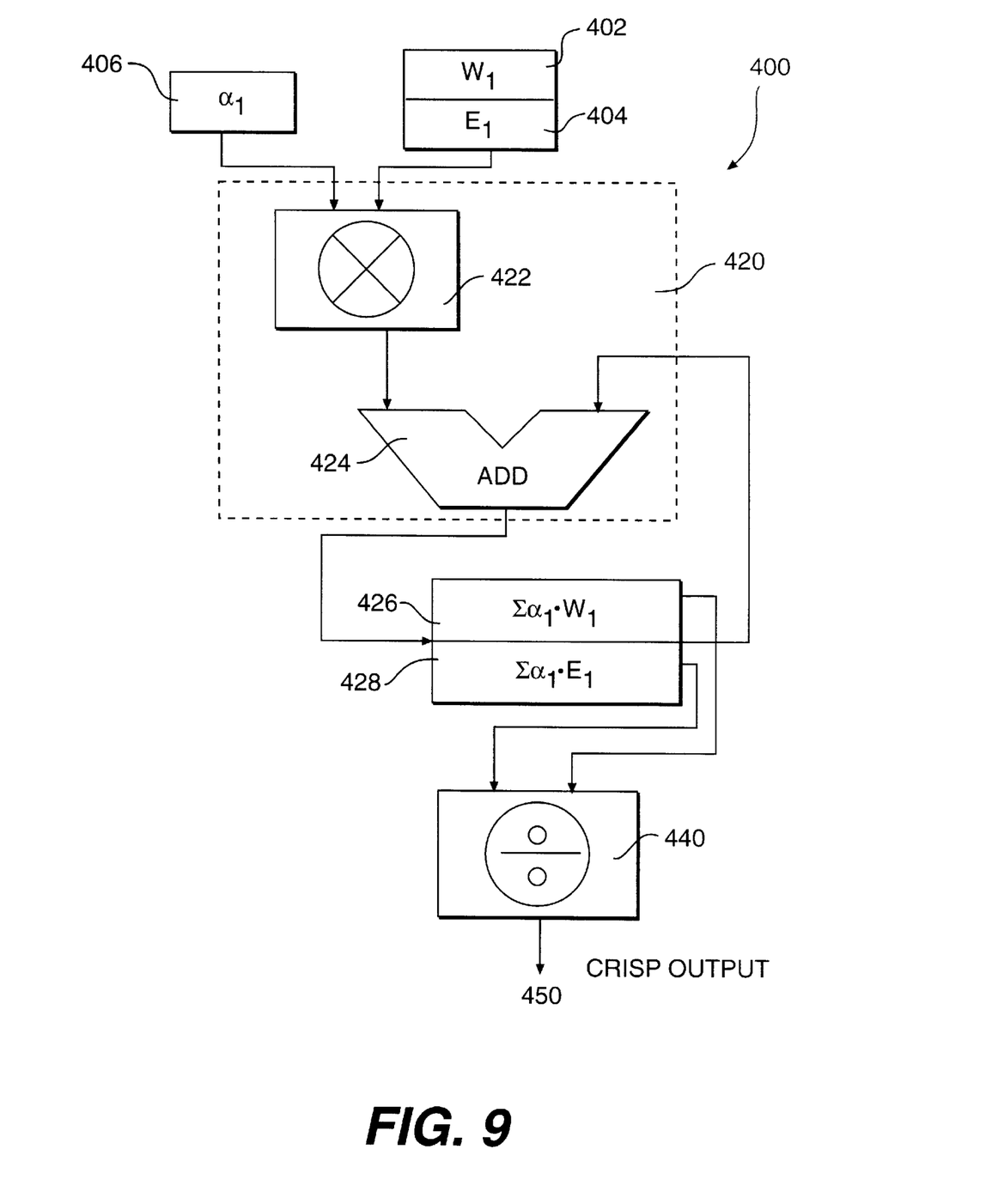
FIGS. 9 and 10 are block diagrams showing a system architecture for implementing the defuzzification algorithm of the present invention on an IC chip.

FIG. 9 is a block diagram to illustrate the architecture of a circuit system 400 for performing defuzzification process on an IC chip. The circuit system 400 has an input port to receive the input data, i.e., the specific weight $W_i$ (402), the effective area $E_i$ (404) and the input data $\alpha_i$ (406) for a plurality of overlapping membership functions, e.g. the membership functions 300, 302, 304, and 306 in FIG. 7. The circuit system 400 also includes a multiplication and adding means 420 to process the multiplication (422) of each the input data $\alpha_i$ (406) to a corresponding specific weight $W_i$ (402) and then to a corresponding effective area $E_i$ (404). The multiplication and adding means 420 then adds (424) each of the products of the $\alpha_{i\ Wi}$ and $\alpha_i E_i$ to generate a sum of $\Sigma \alpha_{i\ Wi}$ (426) and a sum $\Sigma \alpha_i E_i$ (428). A dividing means 440 then divides the sums as obtained by the multiplication and adding means 420 to generate $(\Sigma \alpha_{i\ Wi})/(\Sigma \alpha_i E_i)$ (440) which is the crisp output (450) of the combined membership function as generated from the input data $\alpha_i$ (406) and the membership functions, i.e., 300, 302, 304, and 306 in FIG. 7.

Figure 10:
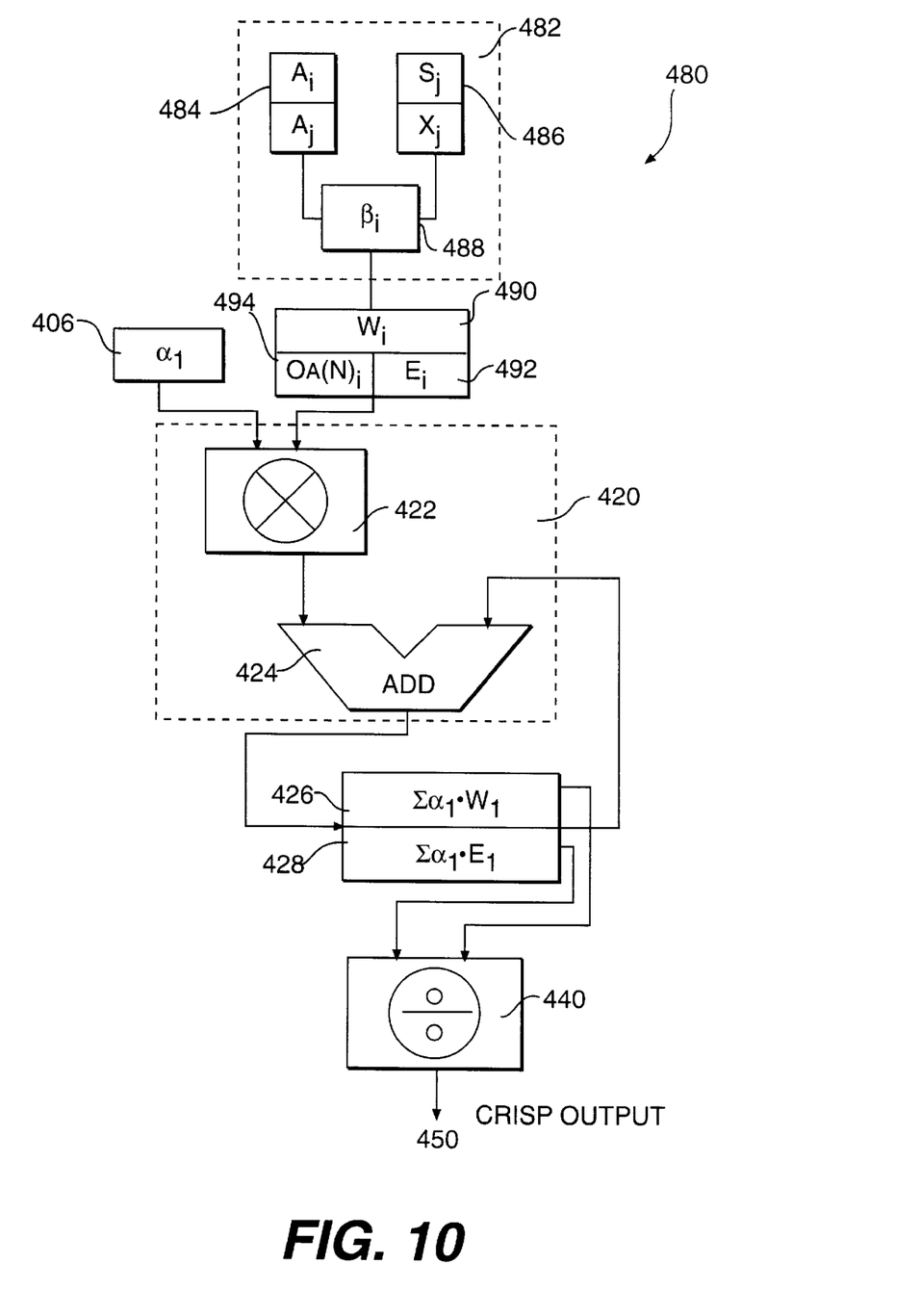

FIG. 10 shows an alternative preferred embodiment which comprises a circuit system 480 which is identical to the circuit system 400 except that the circuit system 480 further comprises a pre-processors 482. The pre-processor 482 includes an area computing means 484 for computing the area of each of the membership functions, and the overlapping areas, i.e., Ai and Dj respectfully in Equations (6) and (17). The pre-processor 482 also includes a centroid computing means 486 for computing the centroid for each of the areas, i.e., Si and Xj in Equations (6) and (17). The pre-processor also includes a β computing means 488 for computing the values of β according to Equation (16) as a function of the configurations of the membership functions, their overlaps and the input $\alpha_i$.

The pre-processor 482 then uses the output data generated by the area computing means 484, the centroid computing means 486 and the β computing means 488 as input to a specific weight computing means 490 and an effective area computing means 492 for computing the specific weight Wi and the effective area Ei for each of the membership functions respectfully. The effective area computing means further includes an overlapping number computing means 494 for computing the overlapping number when there are multiple overlaps among several membership functions for each of the segments as described in aforementioned steps 1 to step 3. The effective area computing means 492 and the overlapping number computing means 494 are therefore capable of computing the effective area without overcounting the multiple overlapping areas between the membership functions. The errors resulted from over-counting the overlapping areas between the membership functions which leads to skewing the value of the centroid computation in the prior art is therefore eliminated.

The circuit systems 400 and 480 and the associated equations used in computations as described in details in Equations (6) to (17) together with their theory and methods are useful not only for triangle or trapezoid types of membership functions, they can also be applied to a variety of polygons for computing the 'effective centroid' with or without the 'Max-Dot' operations. The effective centroid is computed by first computing the effective areas wherein the repetitive counting of the multiple overlapping areas are removed. Then the effective centroid of a plurality of intersected polygons is computed by the use of Equation (17).

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A fuzzy logic control system, including a defuzzification section, for generating a crisp output from a plurality of fuzzy logic signals defining membership functions generated by the fuzzy logic control system, the defuzzification section comprising:

an input port, coupled to the fuzzy logic control system, for receiving an input value $\alpha$, a specific weight, and an effective area for each of said membership functions;

multiplication-and-adding means for computing a first sum of the products of said input values and said specific weights and a second sum of the products of said input values and said effective area; and dividing means for dividing the first sum by the second sum to obtain a crisp output of said membership functions of the fuzzy logic control system; and means for providing the crisp output to external logic.

2. The fuzzy control system of claim 1, wherein said defuzzification section further comprises effective area computing means to compute said effective area for said membership functions.

3. The fuzzy control system of claim 2, wherein said defuzzification section further comprises specific weight computing means to compute said specific weights by multiplying an area of a centroid of each of said membership functions.

4. The fuzzy control system of claim 3, wherein said effective area computing means further comprises multi-overlapping effective area computing means for computing an effective area for said membership functions when the membership functions overlap multiple times, wherein said effective area of each of said membership functions is computed to include an overlapping area between said membership functions only once.

5. The fuzzy control system of claim 4, wherein said multi-overlapping effective area computing means further comprises overlapping number computing means for computing an overlapping number for said overlapping areas for each of said membership functions.

6. A fuzzy logic control system, including a defuzzification section, for generating a crisp output from a plurality of fuzzy logic signals defining membership functions generated by the fuzzy logic control system, the defuzzification section comprising:

effective area computing means for computing an effective area for each of said membership functions, said effective area computing means including a multi-overlapping effective area computing means for computing an effective area for said membership functions when the membership functions overlap multiple times;

said multi-overlapping effective area computing means further including an overlapping number computing means for computing an overlapping number for said overlapping areas for each of said membership functions;

specific weight computing means for computing a specific weight of each of said membership functions;

an input port for receiving input values $\alpha$, said specific weight and said effective area for each of said membership functions;

multiplication-and-adding means for computing a first sum of the input values and said specific weights of corresponding membership functions and a second sum of the products of the input values to said effective area of corresponding membership functions;

dividing means for dividing said first sum by said second sum to obtain a crisp output of said membership functions of the fuzzy control logic system; and means for providing the crisp output to external logic.

7. A defuzzification process for generating a crisp output from a plurality of fuzzy logic membership functions, comprising the steps of:

(a) receiving an input value $\alpha$, a specific weight, and an effective area for each of said membership functions;

(b) computing a first sum of the products of said input value $\alpha$ and said specific weight of corresponding membership functions and a second sum of the products of said input value $\alpha$ and said effective area of corresponding membership functions;

(c) dividing said first sum by said second sum to obtain said crisp output of said membership functions; and (d) transmitting the crisp output to non-fuzzy logic circuitry.

8. The defizzification process of claim 7, wherein said step (a) further comprises a step of (a1) computing said effective area for each of said membership functions.

9. The defuzzification process of claim 8, wherein said step (a1) further comprises a step of (a2) computing said specific weight for each of said membership functions.

10. The defuzzification process of claim 9, wherein said step (a2) further comprises a step of:

(a3) computing a multiple overlapping effective area for said membership functions when the membership functions overlap multiple times, wherein said effective area of each of said membership functions is computed to include an overlapping area between said membership functions only once.

11. The defuzzification process of claim 10 wherein said step (a3) further comprises a step of (a4) computing the number of overlapping areas for each of said membership functions.

12. A circuit device for computing a centroid of integrated polygons of a plurality of $\alpha$-Dot polygons having a plurality of intersected areas, comprising:

an input port for receiving a plurality of input values for said $\alpha$-Dot operation, and a specific weight and an effective area for each of said $\alpha$-Dot polygons;

multiplication-and-adding means for computing a first sum of the products of said input values and said specific weight and a second sum of the products of said input values and said effective area;

dividing means for dividing said first sum by said second sum to obtain said centroid of said integrated polygons; and means for providing the centroid to external logic.

* * * * *